United States Patent
Fehn et al.

(10) Patent No.: US 7,291,670 B2
(45) Date of Patent: Nov. 6, 2007

(54) CROSS-LINKING SILICONE ELASTOMERS, METHOD FOR THE PRODUCTION THEREOF, AND USE OF THE CROSS-LINKABLE MASSES

(75) Inventors: Armin Fehn, Unghausen (DE); Jürgen Weidinger, Polling (DE); Adelheid Dürnberger, Mattighofen (AT)

(73) Assignee: Wacker Chemie AG, Munich (DE)

( * ) Notice: Subject to any disclaimer, the term of this patent is extended or adjusted under 35 U.S.C. 154(b) by 179 days.

(21) Appl. No.: 10/522,504

(22) PCT Filed: Jul. 24, 2003

(86) PCT No.: PCT/EP03/08175

§ 371 (c)(1),
(2), (4) Date: Jan. 26, 2005

(87) PCT Pub. No.: WO2004/013230

PCT Pub. Date: Feb. 12, 2004

(65) Prior Publication Data

US 2006/0058484 A1    Mar. 16, 2006

(30) Foreign Application Priority Data

Aug. 1, 2002  (DE) ............................ 102 35 268

(51) Int. Cl.
*C08L 83/04* (2006.01)

(52) U.S. Cl. .................. 524/588; 525/477; 525/478; 524/430; 524/440; 528/31; 528/32; 528/15

(58) Field of Classification Search ............ None
See application file for complete search history.

(56) References Cited

U.S. PATENT DOCUMENTS

| | | | |
|---|---|---|---|
| 3,296,291 A | 1/1967 | Harrod et al. | |
| 4,026,835 A * | 5/1977 | Lee et al. | 521/108 |
| 4,262,107 A | 4/1981 | Eckberg | |
| 5,312,885 A | 5/1994 | Takago et al. | |
| 5,384,382 A | 1/1995 | Mori et al. | |
| 6,770,700 B2 * | 8/2004 | Mueller et al. | 524/494 |
| 6,797,796 B2 * | 9/2004 | Singh et al. | 528/35 |

FOREIGN PATENT DOCUMENTS

| | | |
|---|---|---|
| DE | 2 008 427 | 9/1970 |
| DE | 2 429 772 | 1/1975 |
| DE | 3 015 890 | 10/1981 |

OTHER PUBLICATIONS abstract for SU 1512997.*
abstract for "Rhodium Complexes as Catalysts for Hydrosilylation Crosslinking of Silicone Rubber" published in the Journal of Applied Polymer Science (1985), 30(5), 1837-46.*
English Derwent Abstract AN 1975-0198W[02] corresp. to DE 2 429 772.
English Derwent Abstract AN 1970-65891R [37] corresp. to DE 2 008 427 A.
English Derwent Abstract AN 1981-818120[45] corresp. to DE 3 015 890 A.
Lewis et al., "Platinum-Catalysed Hydrosilation-Colloid Formation as the Essential Step," J.A. Chem. Soc. 108 (1986), p. 7228-7231.
McCleverty et al., "Dichlorotetracarbonyldirhodium," Inorganic Syntheses, 8 (1996), p. 211-214.

* cited by examiner

*Primary Examiner*—Marc S. Zimmer
(74) *Attorney, Agent, or Firm*—Brooks Kushman P.C.

(57) ABSTRACT

Addition crosslinkable organopolysiloxane compositions employ specific rhodium catalysts. The compositions exhibit storage stability and crosslink effectively to provide highly transparent and colorless organopolysiloxane elastomers.

19 Claims, No Drawings

CROSS-LINKING SILICONE ELASTOMERS, METHOD FOR THE PRODUCTION THEREOF, AND USE OF THE CROSS-LINKABLE MASSES

BACKGROUND OF THE INVENTION

1. Field of the Invention

The invention relates to silicone elastomers which crosslink by special rhodium compounds, a process for preparation thereof and also the use of the crosslinkable compositions.

2. Description of the Related Art

Silicone elastomers are customarily produced by crosslinking with platinum or platinum compounds.

Disadvantages of silicones which are crosslinked with platinum or platinum compounds are the yellow and/or brown color of the crosslinked silicones which are visible, in particular in the case of high silicone contents by volume. The discoloration is caused by the platinum which, at the end of the crosslinking, is present as a platinum colloid as described in the literature, *J. Am. Chem. Soc.* 108 (1986) 7228ff. In addition, in the case of many platinum-crosslinked silicones, the transparency is decreased and the silicone elastomers are as a result not transparent, but cloudy, which is termed translucent. The platinum catalysts have the further disadvantage that silicone rubbers comprising them have only a restricted processing time after the essential constituents are mixed, because after the individual components are mixed the platinum crosslinking begins straight away at room temperature. Although the processing time of the compositions may be increased by incorporating a substance inhibiting the activity of the platinum catalyst (these are generally termed inhibitors), the curing rate of the composition is in turn decreased as a result.

In a few cases, rhodium catalysts are also described for crosslinking silicone elastomers. U.S. Pat. No. 4,262,107 describes silicone rubber compositions which comprise silanol-endstopped polydiorganosiloxanes, silicone hydrides and rhodium catalysts. However in the case of this system, a hydrosilylation reaction does not take place, but, instead, a condensation reaction of $\equiv$Si—OH and $\equiv$Si—H to form $\equiv$—Si—O—Si$\equiv$, with elimination of hydrogen. This system may be suitable for producing coatings, but it is not suitable for producing molded parts because of the hydrogen formation. DE 24 29 772 describes silicone compositions which consist of a vinyl group-containing polyorganosiloxane, a polyorganosiloxane containing silicon-bonded hydrogen atoms, and a rhodium catalyst. Rhodium catalysts used are complexes of the formula $RhX_3(SR_2)_3$ or $Rh_2(CO)_4X_2$, where X is halogen and R in each case is alkyl, aryl, aralkyl or alkylaryl. The resultant silicone compositions have, as advantages, long processing times after all essential constituents have been mixed together at room temperature, even without inhibitors, and good crosslinking characteristics at elevated temperatures. A great disadvantage when $RhX_3(SR_2)_3$, which is described as preferred in DE 24 29 772, is used is the thioethers $(SR_2)$ which are used as ligands. These thioethers are not incorporated by crosslinking, are highly malodorous and are extremely toxic. Furthermore, these thioethers, in some cases, due to the sulfur group, lead to the resultant silicone elastomers having a yellow color. $Rh_2(CO)_4X_2$ also has serious disadvantages. The most serious is certainly the fact that the compound is not stable per se in moist air and gradually decomposes. *Inorg. Synth.* 8 (1966), 211 ff. The rhodium complex in the silicone composition therefore is already beginning to decompose after the latter has been prepared. If it is considered that it can take several months until the silicone composition is processed at the client's premises, it becomes clear that the rhodium complex at this time is already decomposed and is no longer present in its original form, which leads to the fact that the silicone composition either no longer crosslinks at all or has completely unexpected and unwanted crosslinking characteristics.

SUMMARY OF THE INVENTION

It was therefore an object to provide silicone compositions which overcome the disadvantages of the prior art, in particular enable long processing times at room temperature without inhibitor, which cure rapidly at elevated temperatures, and whose vulcanized form exhibits extremely high transparency without yellow or brown coloring.

We have now surprisingly found that the problems can be solved if special rhodium compounds are used.

DETAILED DESCRIPTION OF THE PREFERRED EMBODIMENTS

The present invention therefore relates to organopolysiloxane compositions which cure via at least one rhodium compound and comprise (A) compounds which have radicals containing aliphatic carbon-carbon multiple bonds, (B) organopolysiloxanes containing Si-bonded hydrogen atoms or, instead of (A) and (B)

(C) organopolysiloxanes which have SiC-bonded radicals containing aliphatic carbon-carbon multiple bonds and Si-bonded hydrogen atoms, and (D) a rhodium catalyst, at least one being selected from the group consisting of compounds of the formula

  (III),

  (VI)

or

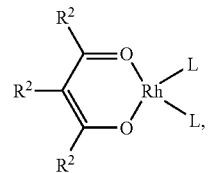  (V)

where $R^2$ can be identical or different and is a hydrogen atom, or monovalent unsubstituted or substituted hydrocarbon radicals having from 1 to 24 carbon atoms, $R^3$ can be identical or different and is hydrogen, —$OR^4$ or monovalent unsubstituted or substituted hydrocarbon radicals having from 1 to 24 carbon atoms, $R^4$ can be identical or different and is a hydrogen atom, or a monovalent unsubstituted or substituted hydrocarbon radical having from 1 to 20 carbon atoms, X can be identical or different and is halogen or hydrogen, L can be identical or different and is CO, acetylacetonate (as O,O-chelate), 0.5 cyclooctadiene, 0.5 norbornadiene or $P(R_3)_3$ and S is 2 or 3.

Where substituted radicals are involved, the substituents are preferably halogen atoms, such as F, Cl, Br and I, cyano radicals, heteroatoms, such as O, S, N and P, and also groups —OR⁴, where R⁴ has the meaning specified above.

The inventive compositions can be single-component organopolysiloxane compositions, and also two-component organopolysiloxane compositions. In the latter case, the two components of the inventive compositions can comprise all constituents in any desired combination, generally with the proviso that a component does not simultaneously comprise siloxanes containing an aliphatic multiple bond, siloxanes having Si-bonded hydrogen and catalyst, that is to say does not essentially simultaneously comprise the constituents (A), (B) and (D), or (C) and (D). Particular preference is given here to one component comprising the constituents (A), (B) or only (C), and the second component comprising (A) and (D).

The compounds (A) and (B) or (C) used in the inventive compositions are selected as is known so that crosslinking is possible. Thus, for example compound (A) has at least two aliphatically unsaturated radicals and siloxane (B) at least three Si-bonded hydrogen atoms, or compound (A) has at least three aliphatically unsaturated radicals and siloxane (B) at least two Si-bonded hydrogen atoms, or else, instead of compound (A) and (B), siloxane (C), which has aliphatically unsaturated radicals and Si-bonded hydrogen atoms in the abovementioned ratios, is used.

Preferably, the inventive silicone compositions comprise, as constituent (A), an aliphatically unsaturated organosilicon compound, in which case all aliphatically unsaturated organosilicon compounds previously used in addition-crosslinking compositions can be used, and also, for example, silicone block copolymers containing urea segments, silicone block copolymers containing amide segments and/or imide segments and/or ester-amide segments and/or polystyrene segments and/or silarylene segments and/or carborane segments and silicone graft copolymers containing ether groups.

As organosilicon compound (A) having SiC-bonded radicals containing aliphatic carbon-carbon multiple bonds, use is preferably made of linear or branched organopolysiloxanes composed of units of the formula $$R_a R^1_b SiO_{(4-a-b)/2} \qquad (I),$$

where

R can be identical or different and is an organic radical free from aliphatic carbon-carbon multiple bonds, $R^1$ can be identical or different and is a monovalent unsubstituted or substituted SiC-bonded hydrocarbon radical containing an aliphatic carbon-carbon multiple bond, a is 0, 1, 2 or 3 and b is 0, 1 or 2 with the proviso that the sum a+b is less than or equal to 3 and on average at least 2 radicals $R^1$ are present per molecule.

Examples of radicals R are alkyl radicals, such as the methyl, ethyl, n-propyl, isopropyl, n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical, cycloalkyl radicals, such as cyclopentyl, cyclohexyl, cycloheptyl and methylcyclohexyl radicals, aryl radicals, such as the phenyl, naphthyl, anthryl and phenanthryl radical, alkaryl radicals such as o-, m-, p-tolyl radicals, xylyl radicals and ethylphenyl radicals, and aralkyl radicals, such as the benzyl radical, the α- and β-phenylethyl radical.

Examples of substituted radicals R are haloalkyl radicals, such as the 3,3,3-trifluoro-n-propyl radical, the 2,2,2,2',2', 2'-hexafluoroisopropyl radical and the heptafluoroisopropyl radical, haloaryl radicals, such as the o-, m- and p-chlorophenyl radicals.

Preferably, the radical R is a monovalent, SiC-bonded, unsubstituted or substituted hydrocarbon radical which is free from aliphatic carbon-carbon multiple bonds and contains from 1 to 18 carbon atoms, particularly preferably a monovalent SiC-bonded hydrocarbon radical which is free from aliphatic carbon-carbon multiple bonds and contains from 1 to 6 carbon atoms, in particular the methyl or phenyl radical.

The radical $R^1$ can be any group accessible to an addition reaction (hydrosilylation) with an SiH-functional compound.

Where the radical $R^1$ is an SiC-bonded substituted hydrocarbon radical, the preferred substituents are halogen atoms, cyano radicals and —OR⁴, where R⁴ has the meaning specified above.

Preferably, radical $R^1$ is alkenyl and alkynyl groups containing from 2 to 16 carbon atoms, such as vinyl, allyl, methallyl, 1-propenyl, 5-hexenyl, ethynyl, butadienyl, hexadienyl, cyclopentenyl, cyclopentadienyl, cyclohexenyl, vinylcyclohexylethyl, divinylcyclohexylethyl, norbornenyl, vinylphenyl and styryl radicals, vinyl, alkynyl, allyl and hexenyl radicals being particularly preferred.

The molecular weight of the constituent (A) can vary within broad limits, for instance between 10² and 10⁶ g/mol. Thus, the constituent (A) can be, for example, a relatively low-molecular-weight alkenyl functional oligosiloxane, such as 1,2-divinyltetramethyldisiloxane, but also a high-polymer polydimethylsiloxane having chain-position or terminal Si-bonded vinyl groups, for example having a molecular weight of 10⁵ g/mol (number average determined by NMR). The structure of the molecules forming the constituent (A) is also not fixed; in particular the structure of a higher-molecular-weight, that is to say oligomeric or polymeric siloxane, can be linear, cyclic, branched or else resin-like, network-like. Linear and cyclic polysiloxanes are preferably composed of units of the formulae $R_3SiO_{1/2}$, $R^1R_2SiO_{1/2}$, $R^1RSiO_{2/2}$ and $R_2SiO_{2/2}$, where R and $R^1$ have the meaning specified above. Branched and network-like polysiloxanes additionally contain trifunctional and/or tetrafunctional units, those of the formulae $RSiO_{3/2}$, $R^1SiO_{3/2}$ and $SiO_{4/2}$ being preferred. Of course, mixtures of different siloxanes satisfying the criteria of constituent (A) can also be used.

Particular preference is given to using vinyl functional, essentially linear, polydiorganosiloxanes having a viscosity of from 0.01 to 500,000 Pa·s, particularly preferably from 0.1 to 100,000 Pa·s, in each case at 25° C., as component (A)

As organosilicon compound (B), use can be made of all hydrogen-functional organosilicon compounds having a viscosity of from 1 to 100,000 mPa·s, preferably from 10 to 10,000 mPa·s, particularly preferably from 50 to 1000 mPa·s, in each case at 25° C., which compounds have also previously been used in addition-crosslinkable compositions.

As organopolysiloxanes (B) which have Si-bonded hydrogen atoms, use is preferably made of linear, cyclic or branched organopolysiloxanes composed of units of the formula $$R_c H_d SiO_{(4-c-d)/2} \quad (II),$$

where

R can be identical or different and has the meaning specified above, c is 0, 1, 2 or 3 and d is 0, 1 or 2, with the proviso that the sum of c+d is less than or equal to 3 and on average at least two Si-bonded hydrogen atoms are present per molecule.

Preferably, the inventively used organopolysiloxane (B) contains Si-bonded hydrogen in the range from 0.04 to 1.7 percent by weight, based on the total weight of the organopolysiloxane (B).

The molecular weight of the constituent (B) can likewise vary within broad limits, for instance between $10^2$ and $10^6$ g/mol. Thus, the constituent (B) can be, for example, a relatively low-molecular-weight SiH-functional oligosiloxane, such as tetramethyldisiloxane, but also a high-polymer polydimethylsiloxane containing chain-position or terminal SiH groups, or an SiH-group-containing silicone resin. The structure of the molecules forming the constituent (B) is also not fixed; in particular the structure of a higher-molecular-weight, that is to say oligomeric or polymeric SiH-containing siloxane can be linear, cyclic, branched or else resin-like, network-like. Linear and cyclic polysiloxanes are preferably composed of units of the formulae $R_3SiO_{1/2}$, $HR_2SiO_{1/2}$, $HRSiO_{2/2}$ and $R_2SiO_{2/2}$, where R has the meaning specified above. Branched and network-like polysiloxanes additionally contain trifunctional and/or tetrafunctional units, those of the formulae $RSiO_{3/2}$, $HSiO_{3/2}$ and $SiO_{4/2}$ being preferred. Of course, mixtures of different siloxanes meeting the criteria of the constituent (B) can also be used. In particular, the molecules forming the constituent (B) can, in addition to the obligatory SiH groups, where appropriate at the same time also contain aliphatically unsaturated groups. Particular preference is given to the use of low-molecular-weight SiH-functional compounds, such as tetrakis(dimethylsiloxy)silane and tetramethylcyclotetrasiloxane, and also of higher-molecular-weight, SiH-containing siloxanes, such as poly(hydrogenmethyl)siloxane and poly(dimethylhydrogenmethyl)siloxane having a viscosity at 25° C. from 10 to 10,000 mPa·s, or analogous SiH-containing compounds in which a portion of the methyl groups is replaced by 3,3,3-trifluoropropyl or phenyl groups.

Constituent (B) is preferably present in the inventive crosslinkable silicone total compositions in an amount such that the molar ratio of SiH groups to aliphatically unsaturated groups is from 0.1 to 20, particularly preferably between 0.8 and 4.0.

The inventively used components (A) and (B) are commercially conventional products or can be prepared by processes customary in chemistry.

Instead of component (A) and (B), the invention compositions can comprise organopolysiloxanes (C) which contain aliphatic carbon-carbon multiple bonds and Si-bonded hydrogen atoms; this is not preferred, however.

If siloxanes (C) are used, these are preferably those composed of units of the formulae $$R_g SiO_{4-g/2}, R_h R^1 SiO_{3-h/2} \text{ and } R_i HSiO_{3-i/2},$$

where R and $R^1$ have the meaning specified therefor above, g is 0, 1, 2 or 3, h is 0, 1 or 2 and i is 0, 1 or 2, with the proviso that, per molecule, at least 2 radicals $R^1$ and at least 2 Si-bonded hydrogen atoms are present.

Examples of organopolysiloxanes (C) are those composed of $SiO_{4/2}$, $R_3SiO_{1/2}$, $R_2R^1SiO_{1/2}$ and $R_2HSiO_{1/2}$ units, what are termed MQ resins where these resins can additionally contain $RSiO_{3/2}$ and $R_2SiO$ units, and also linear organopolysiloxanes essentially consisting of $R_2R^1SiO_{1/2}$, $R_2SiO$ and RHSiO units with R and $R^1$ being identical to the meaning specified above.

The organopolysiloxanes (C) preferably have a mean viscosity of from 0.01 to 500,000 Pa·s, particularly preferably from 0.1 to 100,000 Pa·s, in each case at 25° C.

Organopolysiloxanes (C) can be prepared by methods customary in chemistry.

Examples of $R^2$ are alkyl radicals, such as the methyl, ethyl, n-propyl, isopropyl, 1-n-butyl, 2-n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, cycloalkyl radicals, such as cyclopropyl, cyclopentyl, cyclohexyl, cycloheptyl radicals and methylcyclohexyl radicals, unsaturated radicals, such as the allyl, 5-hexenyl, 7-octenyl, cyclohexenyl and styryl radical, aryl radicals, such as phenyl radicals, o-, m- p-tolyl radicals, xylyl radicals and ethylphenyl radicals and aralkyl radicals, such as the benzyl radical and the α- and β-phenylethyl radical. particularly preferably, $R^2$ is hydrogen, methyl and octyl radicals.

Examples of $R^3$ are alkyl radicals, such as the methyl, ethyl, n-propyl, isopropyl, 1-n-butyl, 2-n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, cycloalkyl radicals, such as cyclopropyl, cyclopentyl, cyclohexyl, cycloheptyl radicals and methylcyclohexyl radicals, unsaturated radicals, such as the allyl, 5-hexenyl, 7-octenyl, cyclohexenyl and styryl radical, aryl radicals, such as phenyl radicals, o-, m-, p-tolyl radicals, xylyl radicals and ethylphenyl radicals, aralkyl radicals, such as the benzyl radical and the α- and α-phenylethyl radical, and also radicals of the formula $-C(R^1)=CR^1{}_2$; further examples of $R^3$ are $-OR^4$ radicals, such as hydroxyl, methoxy, ethoxy, isopropoxy, butoxy and phenoxy radicals.

Examples of halogenated radicals $R^3$ are haloalkyl radicals, such as the 3,3,3-trifluoro-n-propyl radical, the 2,2,2, 2',2',2'-hexafluoroisopropyl radical, the heptafluoroisopropyl radical and haloaryl radicals, such as the o-, m-, and p-chlorophenyl radical.

Preferably, radical $R^3$ is a hydrogen atom, methyl, butyl, phenyl, hydroxyl, methoxy, phenoxy, octyloxy radicals and hydrocarbon radicals containing from 1 to 8 carbon atoms, hydrogen atom, phenoxy radical, methyl, butyl and phenyl radical being particularly preferred.

Examples of radical $R^4$ are the radicals specified for radical $R^3$.

Preferably, $R^4$ is hydrogen atom, alkyl radicals and aryl radicals, hydrogen atom, the methyl, the phenyl and the ethyl radical being particularly preferred.

The inventively used rhodium compounds are known to those skilled in the art and some can be obtained commercially, or can be prepared by known preparation instructions.

The inventively used rhodium catalyst (D) is preferably (acetylacetonato)carbonyl(triphenylphosphine)rhodium(I), (acetylacetonato)dicarbonylrhodium(I), carbonylchlorobis(triphenylphosphine)rhodium(I), (acetylacetonato)(1,5-cyclooctadiene)rhodium(I), rhodium(II) acetate dimer, rhodium(III) acetylacetonate and rhodium(II) octanoate dimer.

The amount of the inventively used rhodium catalyst (D) depends on the desired crosslinking rate and the respective use, and also on economic aspects. The inventive compositions comprise rhodium catalysts (D) in amounts which result in a rhodium content of preferably from 0.05 to 500 ppm by weight (=parts by weight per million parts by weight), particularly preferably from 0.5 to 100 ppm by weight, in particular from 1 to 50 ppm by weight, in each case based on the total weight of the composition.

Apart from the components (A) to (D), the inventive curable compositions can also contain all other substances which have also previously been used for producing addition-crosslinkable compositions.

Examples of reinforcing fillers which can be used as component (E) in the inventive compositions are preferably pyrogenic or precipitated silicic acids having BET surface areas of at least 50 $m^2/g$ and also carbon blacks and activated carbons such as furnace black and acetylene black, pyrogenic and precipitated silicic acids having BET surface areas of at least 50 $m^2/g$ being preferred.

Said silicic acid fillers can have a hydrophilic character or can be rendered hydrophobic by known processes. When hydrophilic fillers are mixed in, it is necessary to add a hydrophobizing agent.

The content of actively reinforcing filler (E) in the inventive crosslinkable composition is in the range from 0 to 70% by weight, preferably from 0 to 50% by weight.

The inventive silicone rubber composition can optionally comprise, as constituent (F), other additives at a content of up to 70% by weight, preferably from 0.0001 to 40% by weight. These additives can be, for example, inactive fillers, resin-like polyorganosiloxanes which are different from the siloxanes (A), (B) and (C), dispersants, solvents, adhesion promoters, coloring agents such as inorganic pigments (for example cobalt blue) and organic dyes, plasticizers, organic polymers, etc. These include additives such as quartz flour, diatomaceous earth, clays, chalk, lithopone, carbon black, graphite, metal oxides, metal carbonates, metal sulfates, metal salts of carboxylic acids, metal dusts, fibers such as glass fibers, plastic fibers, plastic powders, metal dusts, dyes, pigments etc. Furthermore, agents to improve heat resistance and flame retarding ability, what are termed heat stabilizers, can be added. Here, all heat stabilizers employed to date in silicone rubbers can be used. Preferably, however, these are transition metal compounds and carbon black. Examples are cerium oxide, cerium octoate, cerium-siloxane compounds, iron oxide, iron octoate, iron-siloxane compounds, zinc carbonate, manganese carbonate and titanium oxide.

Furthermore, additives (G) can be present which serve for selective setting of the processing time, and crosslinking start temperature and crosslinking rate of the inventive compositions. These inhibitors and stabilizers are very well known in the field of addition-crosslinking compositions. Examples of customary inhibitors are acetylenic alcohols, such as 1-ethynyl-1-cyclohexanol, 2-methyl-3-butyn-2-ol, 3,5-dimethyl-1-hexyn-3-ol and 3-methyl-1-dodecyn-3-ol, polymethylvinylcyclosiloxanes, such as 1,3,5,7-tetravinyltetramethyltetracyclosiloxane, low-molecular-weight silicone oils containing methylvinylSiO$_{2/2}$groups and/or R$_2$vinylSiO$_{1/2}$ end groups such as divinyltetramethyldisiloxane, tetravinyidimethyldisiloxane, trialkyl cyanurates, alkyl maleates, such as diallyl maleates, dimethyl maleate and diethyl maleate, alkyl fumarates, such as diallyl fumarate and diethyl fumarate, organic hydroperoxides, such as cumene hydroperoxide, tert-butyl hydroperoxide and pinane hydroperoxide, organic peroxides, organic sulfoxides, organic amines, diamines and amides, phosphanes and phosphites, nitriles, triazoles, diaziridines and oximes. The effect of these inhibitor additions (G) depends on their chemical structure such that it must be determined individually.

The inhibitor content of the inventive compositions is preferably from 0 to 50,000 ppm, particularly preferably from 0 to 1000 ppm, in particular from 0 to 100 ppm.

The inventive organopolysiloxane compositions can, if required, be dissolved, dispersed, suspended or emulsified in liquids. The inventive compositions can, in particular depending on the viscosity of the constituents and also filler content, be of low viscosity and pourable, have a pasty consistency, be pulverulent or else be conformable high-viscosity compositions, as is known can be the case with the compositions frequently termed in specialist circles RTV-1, RTV-2, LSR and HTV. With respect to the elastomeric properties of the crosslinked inventive silicone compositions, likewise the entire spectrum is comprised, starting with extremely soft silicone gels, via rubber-like materials up to highly crosslinked silicones having a glasslike behavior.

The invention further relates to a process for preparing the inventive organopolysiloxane compositions by mixing the rhodium catalyst (D) with a mixture composed of (A), if appropriate (E) and (F), and (B).

The inventive organopolysiloxane compositions can be prepared by known processes, for example by homogeneous mixing of the individual components. The sequence here may be as desired, but preference is to be given to homogeneous mixing of the rhodium catalyst (D) with a mixture of (A), if appropriate (E) and (F), and (B) as the final component. The mixture can also be made up as a two-component system, in a similar manner to the known platinum-crosslinking mixtures. In this case the first component generally comprises (A), (D) and if appropriate (E) and (F) and the second component comprises (B) and if appropriate (A), (E) and (F). However, the two-component system can alternatively be made up in such a manner that the first component comprises (A), (B) and if appropriate (E) and (F), and the second component consists of (D) and if appropriate (A), (E) and (F). In the case of the two-component systems, the two components must be mixed before the crosslinking which can be performed, according to viscosity, either with a stirrer, dissolver, roll or kneader. The two components can be made up in such a manner that the components preferably need to be mixed in a ratio of 1:1, but they can also be made up in such a manner that for 200 parts by weight of one component, 1 part by weight of the other component is present. All mixing ratios lying between these are also possible. The inventively used rhodium catalyst (D) can be incorporated as solid substance or as solution, dissolved in a suitable solvent, or as what is termed a masterbatch, homogeneously mixed with a small amount of (A) or (A) with (E). The mixing, depending on the viscosity of (A), is performed, for example, using a stirrer, in a dissolver, on a roller or in a kneader. The catalyst (D) can also be encapsulated in an organic thermoplastic or thermoplastic silicone resin.

The inventively used components (A) to (G) can be in each case a single type of such a component, or else a mixture of at least two different types of such a component.

The inventive compositions which can be crosslinked by addition of Si-bonded hydrogen to aliphatic multiple bond can be crosslinked under the same conditions as the previously known compositions which can be crosslinked by hydrosilylation reactions with platinum. Preference is given here to temperatures of from 50 to 220° C., particular preference to from 120 to 190° C., and to a pressure of from 900 to 1100 hPa. However, alternatively, higher or lower temperatures and pressures can be employed. The crosslinking can also be carried out photochemically using high-energy radiation, for example visible light of short wavelengths and UV light, or with a combination of thermal and photochemical excitation.

The present invention also relates to extrudates and moldings produced by crosslinking the inventive compositions.

The inventive compositions and also the crosslinking products produced therefrom according to the invention can be used for all purposes for which the organopolysiloxane compositions which have also previously been crosslinkable to give elastomers, or elastomers, have been used. This comprises, for example, silicone coating or impregnation of any desired substrates, production of molded parts, for example in the injection-molding process, vacuum extrusion process, extrusion process, casting in molds and compression molding, and castings, uses as sealing, embedding or pouring compositions etc. Particular preference is given to molded parts and extrudates which must have a particularly high transparency, such as diving masks, pacifiers, spectacle cleaning baths and desired adhesions and coatings of transparent substrates, such as glass and polycarbonate, food molds, such as baking molds or molds for producing confectionary products such as chocolate candies; tubes, profiles, seals and damping elements, etc.

The inventive crosslinkable compositions have the advantage that they can be prepared in a simple process using readily accessible starting materials and can thus be prepared economically.

The inventive crosslinkable compositions have the advantage that, as inhibitor-free formulations at 25° C. and ambient pressure, they have a good shelf life and do not crosslink rapidly until at elevated temperature.

The inventive silicone compositions have the advantage that they, in the case of two-component formulation give, after the two components are mixed, a crosslinkable silicone composition whose processability persists over a long period at 25° C. and ambient pressure (extremely long potlife) and which does not crosslink rapidly until at elevated temperature.

The inventive compositions have the further advantage that the crosslinked silicone rubbers have excellent translucency and transparency.

The inventive compositions further have the advantage that the crosslinked silicone rubbers are not yellow or brown colored.

The inventive compositions further have the advantage that the hydrosilylation reaction does not slow down with the length of the reaction time.

The inventive compositions further have the advantage that the hydrosilylation reaction does not change even after relatively long storage at room temperature (in particular does not slow down).

In the examples described hereinafter, all data on parts and percentages, unless otherwise stated, are based on weight. Unless otherwise stated, the examples hereinafter are carried out at a pressure of the ambient atmosphere, that is approximately at 1000 hPa, and at room temperature, that is at approximately 20° C., or at a temperature which is established when combining the reactants at room temperature without additional heating or cooling.

Hereinafter, all viscosity data are based on a temperature of 25° C.

EXAMPLE 1

A laboratory kneader was charged with 405 parts of a vinyldimethylsiloxy-terminated polydimethylsiloxane having a viscosity of 20 Pa·s; this was heated up to 150° C. and admixed with 366 parts of a hydrophobic pyrogenic silicic acid having a specific BET surface area of 300 $m^2/g$ and a carbon content of 4.2% by weight. This produced a high-viscosity composition which was then diluted with 229 parts of the abovementioned polydimethylsiloxane. By kneading under vacuum (10 mbar) at 150° C., volatile constituents were removed in the course of one hour. This composition is termed basic composition 1.

Component A 906 parts of the basic composition 1 were mixed homogeneously under vacuum in the kneader at room temperature with 7 parts of a vinyldimethylsiloxy-terminated polydimethylsiloxane having a viscosity of 20 Pa·s and 0.061 parts of bis (triphenylphosphine)carbonylrhodium(I)chloride (this corresponds to 10 ppm of rhodium in the total mass of component A), dissolved in tetrahydrofuran.

Component B 931 parts of the basic composition 1 were mixed on a roller at a temperature of 25° C. with 55 parts of SiH crosslinker to give a homogeneous composition, with the SiH crosslinker being a trimethylsiloxy-terminal methyl hydrogen polysiloxane, $Me_3Si$—(—O—SiH(Me))$_n$—O—$SiMe_3$, which according to $^{29}Si$—NMR has a number average chain length of n=53.

Before the crosslinking, the components A and B were mixed in a ratio of 1:1 using a laboratory agitator.

EXAMPLE 2

Similar to Example 1, except that, instead of bis(triphenylphosphine)carbonylrhodium(I) chloride/tetrahydrofuran solution, 0.029 parts of rhodium(III) acetylacetonate, dissolved in dichloromethane, were used.

EXAMPLE 3

Similar to Example 1, except that instead of bis(triphenylphosphine)carbonylrhodium(I) chloride/tetrahydrofuran solution, 0.021 parts of carbonyltriphenylphosphinerhodium(I) acetylacetonate dissolved in dichioromethane were used.

COMPARATIVE EXAMPLE 1

The procedure described in Example 1 is repeated except that the catalyst used was 16 ppm of platinum as platinum-divinyltetramethyldisiloxane complex in vinyl-terminated polydimethylsiloxane (commercially available from ABCR GmbH & Co, Germany).

COMPARATIVE EXAMPLE 2

The procedure described in Example 1 is repeated except that the catalyst used was 16 ppm of platinum as platinum-divinyltetramethyldisiloxane complex in vinyl-terminated polydimethylsiloxane (commercially available from ABCR GmbH & Co, Germany) and 2 parts of ethynylcyclohexanol were used as inhibitor.

EXAMPLE 4

589.4 parts of a vinyldimethylsiloxy-terminated polydimethylsiloxane having a Brabender plasticity of 630 mkp equivalent to a mean molar mass of approximately 500,000 g/mol were mixed with 252.6 parts by mass of a hydrophobic pyrogenic silicic acid having a BET surface area of 300 m$^2$/g and a carbon content of 3.95% by weight, which were added in portions, for 4 hours in a kneader to give a homogeneous composition.

500 parts of the basic composition 2 thus obtained were mixed on a roller at a temperature of 20° C. with 0.1 part of inhibitor, 7.5 parts of SiH crosslinker and 2 parts of catalyst batch to give a homogeneous composition, in which case the inhibitor used was 1-ethynyl-1-cyclohexanol, and the SiH crosslinker was a mixed polymer of dimethylsiloxy and methylhydrogensiloxy and trimethylsiloxy units having a viscosity of 310 mPa·s at 25° C. and a Si-bonded hydrogen content of 0.46% by weight. The catalyst batch is prepared by homogenizing 200 parts of the above described basic composition 2 with 1.8 parts of rhodium(II) octanoate dimer (dissolved in dichloromethane) for 30 minutes in a kneader.

COMPARATIVE EXAMPLE 3

The procedure described in Example 4 is repeated except that the catalyst used was 10 ppm of platinum as platinum-divinyltetramethyldisiloxane complex in vinyl-terminated polydimethylsiloxane (commercially available from ABCR GmbH & Co, Germany) and 0.5 parts of inhibitor (=1-ethynyl-1-cyclohexanol) were used.

The thermal curing properties of the silicone compositions prepared in Examples 1 to 4 and Comparative Examples 1 to 3 (C1, C2, C3) were measured using a Goettfert Elastograph, more precisely 7 hours after the A and B components had been mixed in a ratio of 1:1. Example 4 and Comparative Example 3 were measured immediately after mixing.

For quantitative determination of the stability, the formulations prepared were stored at room temperature (RT), the time (measured in days) for the initial viscosity value to double being determined. The measurement results are shown in Table 1.

TABLE 1

| Examples | 1 | 2 | 3 | C1 | C2 | 4 | C3 |
|---|---|---|---|---|---|---|---|
| a$_T$ [° C.] | 132 | 125 | 118 | —* | 120 | 135 | 122 |
| Storage at RT | >10 d | >10 d | >10 d | <<1 d | <8 d | >10 d | <4 d |

—*: The mixture was already crosslinked before the measurement.
d: days
s: seconds The kick-off temperature a$_T$ was determined using a heating rate of 10° C./min. The temperature corresponding to the 4% value of maximum torque was defined as the kick-off temperature.

The t$_{50}$ value was determined in accordance with DIN 53529 T3. The time from the start of curing to 50% (t$_{50}$ value) of the maximum torque was determined at 150° C.

For further comparison, crosslinked silicone rubber films were produced from the silicone compositions and the mechanical properties were determined. The crosslinked silicone rubbers were produced by crosslinking the mixture of the respective example in a hydraulic press at a temperature of 170° C. for 10 minutes to give the silicone rubber. The demolded silicone rubber films, of approximately 2 mm or 6 mm in thickness, were subjected to mechanical tests.

The result is shown in Table 2.

TABLE 2

| | Hardness [Shore A] | TS [N/mm$^2$] | EB [%] | Appearance |
|---|---|---|---|---|
| Example 1 | 58 | 11.8 | 570 | colorless, transparent |
| Example 2 | 56 | 10.4 | 550 | colorless, transparent |
| Example 3 | 60 | 11.0 | 580 | colorless, transparent |
| Comparison C1 | —* | —* | —* | —* |
| Comparison C2 | 60 | 10.8 | 580 | slight yellow coloration |
| Example 4 | 37 | 12.3 | 1180 | colorless, transparent |
| Comparison C3 | 39 | 13.0 | 1100 | yellow hue |

—* Already crosslinked in advance.
Hardness: Shore A hardness was determined in accordance with DIN 53505,
TS: Tear strength was determined in accordance with DIN 53504-S1
EB: Elongation at break was determined in accordance with DIN 53504-S1
TPR: Tear propagation resistance was determined in accordance with ASTM D 624
RR: Rebound resilience was determined in accordance with DIN 53512

EXAMPLE 5

50.0 g of a vinyldimethylsiloxy-terminated polydimethylsiloxane having a viscosity of 20 Pa·s, and 1.0 g of SiH crosslinker, were homogeneously mixed using a TYPE RE 162 agitator from Janke & Kunkel IKA-Labortechnik in which case the SiH crosslinker was a mixed polymer of dimethylsiloxy and methylhydrogensiloxy and trimethylsiloxy units having a viscosity of 330 mPa·s and a content of Si-bonded hydrogen of 0.46% by weight. Then, 3.7 mg of bis(triphenylphosphine)carbonylrhodium(I) chloride (this is equivalent to a content of 10 ppm of rhodium based on the total mass), dissolved in 0.5 ml of methylene chloride, and 60 mg of 1-ethynyl-1-cyclohexanol were stirred in at room temperature.

COMPARATIVE EXAMPLE 4

The procedure described in Example 5 is repeated except that, instead of the rhodium catalyst, 10 ppm of platinum as platinum-divinyltetramethyldisiloxane complex in vinyl-terminated polydimethylsiloxane (commercially available from ABCR GmbH & Co, Germany) were used.

The thermal curing properties of the silicone compositions prepared in Example 5 and also Comparative Example 4 (C4) were measured using a Dynamic Analyzer RDA II, from Rheometrics employing a heat-up curve from 30 to 200° C. and a heating rate of 5° C./minute.

For quantitative determination of the shelf life, the formulations prepared were stored at room temperature (RT), the time (measured in days) for the initial viscosity value to double being determined. The measurement results are shown in Table 3.

TABLE 3

| Example | 5 | C4 |
|---|---|---|
| Kick-off temperature [° C.] | 123 | 105 |
| Storage at RT | >20 d | <10 d |

The kick-off temperature was determined using a heating rate of 5° C./min.
d: Days

The invention claimed is:

1. An addition crosslinkable organopolysiloxane composition which does not generate hydrogen gas upon curing, comprising:
    (A) at least one compound containing aliphatic carbon-carbon multiple bonds,
    (B) at least one organopolysiloxane containing Si-bonded hydrogen atoms,
    (C) or, instead of (A) and (B), at least one organopolysiloxane which contains SiC-bonded radicals containing aliphatic carbon-carbon multiple bonds and also contains Si-bonded hydrogen atoms, and
    (D) at least one rhodium catalyst selected from the group consisting of compounds of the formulae

and rhodium (II) octanoate dimer
    where
    $R^3$ are each independently hydrogen, $-OR^4$, or a monovalent unsubstituted or substituted $C_{1-24}$ hydrocarbon radical,
    $R^4$ are each independently a hydrogen atom or monovalent unsubstituted or sudstituted $C_{1-20}$ hydrocarbon radical,
    X where present, is a halogen or hydrogen atom,
    L are each independently CO, acetylacetonate, 0.5 cyclooctadiene, 0.5 norbornadiene or $P(R^3)_3$, and
    s is 0 to 3.

2. The organopolysiloxane composition of claim 1, wherein at least one rhodium compound is selected from the group consisting of
    (acetylacetonatocarbonyl)(triphenylphosphine)rhodium (I),
    carbonylchlorobis(triphenylphosphine)rhodium(I),
    (acetylacetonato)(1,5-cyclooctadiene)rhodium(I),
    rhodium(II) octanoate dimer.

3. The organopolysiloxane composition of claim 1, wherein a heat stabilizer is present as a constituent F.

4. The organopolysiloxane composition as claimed in claim 3, further comprising at least one heat stabilizer selected from the group consisting of cerium oxide, cerium octoate, cerium-siloxane compounds, iron oxide, iron octoate, iron-siloxane compounds, zinc carbonate, manganese carbonate and titanium oxide.

5. A process for preparing an organopolysiloxane composition of claim 1, comprising mixing a rhodium catalyst (D) with a mixture comprising (A), optionally filler (E), heat stabilizer (F), and (B).

6. The process of claim 5, wherein said organopolysiloxane composition comprises two components, a first component comprising (A), (D), and optionally (E) and optionally (F), and a second component comprising (B), optionally (A), optionally (E), and optionally (F).

7. The process of claim 1, wherein said organopolysiloxane composition comprises two components, a first component comprising (A), (B), optionally (E) and optionally (F), and a second component comprising (D), optionally (A), optionally (E), and optionally (F).

8. A molding or extrudate prepared by curing the organopolysiloxane composition of claim 1.

9. A molding or extrudate prepared by curing the B organopolysiloxane composition of claim 2.

10. A molding or extrudate prepared by curing the B organopolysiloxane composition of claim 3.

11. A food mold which comprises a molding or extrudate prepared by curing an organopolvsiloxane composition which does not generate hydrogen gas upon curing, comprising:
    (A) at least one compound containing aliphatic carbon-carbon multiple bonds,
    (B) at least one organopolvsiloxane containing Si-bonded hydrogen atoms,
    (C) or, instead of (A) and (B), at least one organopolysiloxane which contains SiC-bonded radicals containing aliphatic carbon-carbon multiple bonds and also contains Si-bonded hydrogen atoms, and
    (D) at least one rhodium catalyst selected from the group consisting of compounds of the formulae

and rhodium (II) octanoate dimer
    where
    $R^3$ are each independently hydrogen, $-OR^4$, or a monovalent unsubstituted or substituted $C_{1-24}$ hydrocarbon radical,
    $R^4$ are each independently a hydrogen atom or a monovalent unsubstituted or substituted $C_{1-20}$ hydrocarbon radical,
    X Where present, is a halogen or hydrogen atom,
    L are each independently CO, acetylacetonate, 0.5 cyclooctadiene, 0.5 norbornadiene or $P(R^3)_3$, and
    s is 0 to 3.

12. The molding or extrudate of claim 8, which is colorless and transparent.

13. An addition crosslinkable organopolysiloxane composition which does not generate hydrogen gas upon curing, comprising:
    (A) at least one compound containing aliphatic carbon-carbon multiple bonds,
    (B) at least one organopolysiloxane containing Si-bonded hydrogen atoms,
    (C) or, instead of (A) and (B), at least one organopolysiloxane which contains SiC-bonded radicals containing aliphatic carbon-carbon multiple bonds and also contains Si-bonded hydrogen atoms, and
    (D) at least one rhodium catalyst selected from the group consisting of compounds of the formulae

and rhodium (II) octanoate dimer
    where
    $R^3$ are each independently hydrogen, $-OR^4$, or a monovalent unsubstituted or substituted $C_{1-24}$ hydrocarbon radical,
    $R^4$ are each independently a hydrogen atom or a monovalent unsubstituted or substituted $C_{1-20}$ hydrocarbon radical,
    X Where present, is a halogen or hydrogen atom, L are each independently CO, acetylacetonate, 0.5 cyclooctadiene, 0.5 norbornadiene or $P(R^3)_3$, and s is 0 to 3.

wherein at least one compound (A) is a vinyldimethylsilyl-terminated polydiorganosiloxane wherein said organo groups are selected from the group consisting of alkyl groups and phenyl groups.

14. The composition of claim 13, wherein at least one compound (A) is a vinyldimethylsilyl-terminated polydimethylsiloxane.

15. The composition of claim 11, wherein at least one catalyst is selected from the group consisting of bis[triphenylphosphine]carbonylrhodium (I) chloride, carbonyl[triphenylphosphine]rhodium acetylacetonate, acetylacetonato (1,5-cyclooctadiene)rhodium (I), and (acetylacetonato) dicarbonylrhodium (I).

16. The composition of claim 13, wherein at least one catalyst is selected from the group consisting of bis[triphenylphosphine]carbonylrhodium (I) chloride, carbonyl[triphenylphosphine]rhodium acetylacetonate, acetylacetonato (1,5-cyclooctadiene)rhodium (I), and (acetylacetonato) dicarbonylrhodium (I).

17. The organopolysiloxane composition as claimed in claim 13, further comprising at least one heat stabilizer selected from the group consisting of cerium oxide, cerium octoate, cerium-siloxane compounds, iron oxide, iron octoate, iron-siloxane compounds, zinc carbonate, manganese carbonate and titanium oxide.

18. The organopolysiloxane composition as claimed in claim 15, further comprising at least one heat stabilizer selected from the group consisting of cerium oxide, cerium octoate, cerium-siloxane compounds, iron oxide, iron octoate, iron-siloxane compounds, zinc carbonate, manganese carbonate and titanium oxide.

19. The organopolysiloxane composition as claimed in claim 16, further comprising at least one heat stabilizer selected from the group consisting of cerium oxide, cerium octoate, cerium-siloxane compounds, iron oxide, iron octoate, iron-siloxane compounds, zinc carbonate, manganese carbonate and titanium oxide.

* * * * *

UNITED STATES PATENT AND TRADEMARK OFFICE
CERTIFICATE OF CORRECTION

PATENT NO. : 7,291,670 B2  Page 1 of 1
APPLICATION NO. : 10/522504
DATED : November 6, 2007
INVENTOR(S) : Armin Fehn et al.

It is certified that error appears in the above-identified patent and that said Letters Patent is hereby corrected as shown below:

Column 13, Line 36, Claim 1:

Delete "sudstituted" and insert -- substituted --.

Column 14, Line 8, Claim 9:

Delete "B".

Column 14, Line 10, Claim 10:

Delete "B".

Signed and Sealed this

Eighth Day of April, 2008

JON W. DUDAS
*Director of the United States Patent and Trademark Office*